(12) United States Patent
    Stokes et al.

(10) Patent No.:  US 8,215,333 B2
(45) Date of Patent:  Jul. 10, 2012

(54) FUEL FILLER ASSEMBLY

(75) Inventors: Ryan Matthew Stokes, Dublin, OH (US); Michael E. Franz, Dublin, OH (US); Shawn Lee Tarr, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 522 days.

(21) Appl. No.: 12/485,587

(22) Filed: Jun. 16, 2009

(65) Prior Publication Data

US 2010/0313969 A1    Dec. 16, 2010

(51) Int. Cl.
    *B60K 15/04*    (2006.01)
(52) U.S. Cl. .................. 137/312; 280/834; 220/86.2
(58) Field of Classification Search .................. 137/312; 280/834; 220/86.2; 296/97.22; 141/312, 141/348
    See application file for complete search history.

(56) References Cited

U.S. PATENT DOCUMENTS

| 3,159,409 | A | * | 12/1964 | Koehler ..................... 220/86.2 |
| 4,185,844 | A |   | 1/1980  | Hubbard et al. |
| 4,467,937 | A |   | 8/1984  | Shaw |
| 4,817,691 | A |   | 4/1989  | Lau |
| 5,031,302 | A | * | 7/1991  | Anhegger et al. ............. 29/516 |
| 5,261,700 | A |   | 11/1993 | Martenas et al. |
| 5,735,322 | A | * | 4/1998  | Palvolgyi ................... 220/86.2 |
| 5,785,099 | A |   | 7/1998  | Kashani |
| 7,311,348 | B1|   | 12/2007 | Bang |
| 7,380,861 | B2|   | 6/2008  | Engel |

* cited by examiner

*Primary Examiner* — Kevin Lee
(74) *Attorney, Agent, or Firm* — Rankin Hill & Clark LLP

(57) ABSTRACT

A fuel filler adapter for a vehicle including a rigid housing connected to the vehicle and having a fuel pipe opening defined therethrough; and a flexible plastic overmold formed to the rigid housing. The overmold includes a radial wall defining an aperture that is in registry with the fuel pipe opening, a drainage skirt at least partially encircling the aperture for catching overflow fuel, and an overflow channel disposed below the aperture. The overflow channel may be defined by the radial wall and/or the skirt.

20 Claims, 6 Drawing Sheets

FUEL FILLER ASSEMBLY

BACKGROUND

The present exemplary embodiments herein relate to fuel filler assembly for a vehicle gas tank and more particularly relate to a fuel filler adapter with a drainage feature for collecting and draining overflow fuel in a vehicle and will be described with particular reference thereto. However, it is to be appreciated that the exemplary embodiments discussed herein are also amenable to other like applications.

It has become custom practice for drivers to refuel vehicles themselves rather than to seek the service of a skilled service attendant. A fuel injection hole is generally disposed in a housing apparatus and mounted in the fuel door of a vehicle body. To refuel, a fuel pump nozzle is inserted into a fuel injecting hole disposed in a housing apparatus in the fuel door of a vehicle body. This process may lead to fuel spills caused by a misguided entry of fuel, back flow, and/or drips from the nozzle when it is removed from the fuel pipe. The gasoline may spill down the outer adjacent vehicle body causing permanent damage to the vehicle's finish. Additionally, the fuel may create a film on the body that quickly attracts dirt, dust, and other foreign, unsightly material.

A variety of devices have been proposed for protecting vehicle bodies from fuel spillage. For example, U.S. Pat. No. 4,817,691 suggests an automobile fuel bib that prevents trickling or overflowing fuel from contacting an automobile's finish during filling. The bib comprises a flat sheet of rubber having a narrow top part with a hole for placement around a fill pipe. The design requires the use of a supporter attached to the underside of the bib to guide the bib into its proper shape. The bib is flexible and compact allowing it to be tucked into a fill-pipe compartment for storage. Another device, disclosed in U.S. Pat. No. 5,785,099, provides a fuel guard that protects the fender area of an automobile's surface from damage caused by gasoline spills during refueling and marring caused by incidental contact with the fuel pump nozzle. This device may be attached to an automobile and rolled up in the fuel fill compartment for storage. When the door of the automobile's fuel compartment is opened, the sheet extends down along the fender area of the automobile. However, the above devices try to protect a vehicle surface once fuel has already spilled outside of the fuel fill compartment. This runs the risk of fuel spilling onto unprotected areas of the body and spilling onto people as they fill the fuel tank.

Currently, there are various proposed methods to catch spilled fuel and funnel the fuel out of the vehicle without ever exposing the fuel to the exterior of the vehicle body. For example, U.S. Pat. No. 5,261,700 discloses a fuel tank assembly with an overflow channel to minimize fuel spillage. The assembly includes a fuel tank with a filler neck and a grommet. The grommet includes a skirt at one end adapted to encircle the filler neck and at least one flange at the other end. Disposed between the flange and the skirt is an overflow channel. The wall of the overflow channel contains a drain outlet that may receive a drain pipe. The drain pipe is routed from the outlet across the top of the fuel tank and down one side so it can drain to the ground. The overflow channel is disposed at the lowest part of the grommet so that any spilled fuel will readily drain from the overflow channel to the drain pipe. This method requires many parts, making its use costly and limited in design.

With reference to FIG. 1, a known sheet metal fuel filler adapter 100 is depicted. The adapter 100 includes a sheet metal housing 102 connected to a vehicle body 110. The adapter 100 further includes a separate plastic piece 104 disposed around a fuel pipe opening 106 having a lip 108 extending outwardly below the fuel pipe opening 106. The lip 108 operates as a fuel catcher/drain and prevents overflow fuel from spilling down the outside painted surface of the vehicle body 110. This design functions well, but it is expensive and heavy due to the addition the extra plastic piece 104 and the use of sheet metal as the housing 102.

With reference to FIGS. 2a and 2b, another known design uses an overmolded plastic fuel filler adapter 120 disposed in the side panel 122 of a vehicle. The adapter 120 includes a base housing 124 and an overmolded plastic portion 126 formed to the base housing 124. The overmolded plastic portion 126 surrounds a fuel pipe opening 128. The bottom of the adapter 120 includes a drain hole 130 and acts as a fuel catcher to funnel spilled fuel down the drain hole 130. As best seen in FIG. 2b, this configuration requires the bottom portion of the adapter 120 to be positioned at an angle sloping significantly downward laterally into the vehicle in order to hold a required volume of overflow fuel since drainage is not instantaneous. The sloped angle also helps to force fuel to flow out through the drain hole 130. Using the bottom portion of the adapter 120 to capture and funnel spilled fuel places restrictions on the angle of this portion since it must be set independently of all other design considerations. Particularly, this design restricts the moldability and installability of the fuel filler adapter 120 since it cannot be undercut in the mold and the bottom portion of the adapter 120 cannot protrude significantly below the fuel door opening 132.

BRIEF DESCRIPTION

According to one aspect, a fuel filler adapter for a vehicle is provided that includes a rigid housing connected to the vehicle and a flexible plastic overmold formed to the rigid housing. The housing defines fuel pipe opening. The flexible plastic overmold includes a radial wall defining an aperture that is in registry with the fuel pipe opening, a drainage skirt at least partially encircling the aperture for catching overflow fuel and an overflow channel disposed below the aperture. The overflow channel is defined by at least one of the radial wall and the skirt.

According to another aspect, a fuel filler assembly is provided to prevent overflow fuel from spilling down the outside surface of a vehicle. The assembly includes a rigid housing attached to the vehicle and an adapter overmolded onto the rigid housing. The adapter includes an aperture adapted to receive an associated fuel pipe and a curved shelf disposed below the aperture that defines an overflow channel for receiving fuel spilling from the associated fuel pipe.

According to still another aspect, a drain structure for collecting overflow fuel in a vehicle is provided. The drain structure includes a fuel inlet opening capable of receiving a fuel pipe and a unitary housing formed of a rigid material having a flexible plastic overlay molded thereto. The overlay defines an aperture, a lip partially around the aperture, and an overflow hole adapted to drain spilled fuel collected by the lip.

BRIEF DESCRIPTION OF THE DRAWINGS

FIG. 2b is an enlarged, cross-sectional view of the fuel filler area with a plastic overmolded fuel filler adapter taken along line I-I of FIG. 2a.

DETAILED DESCRIPTION

Figure 1:
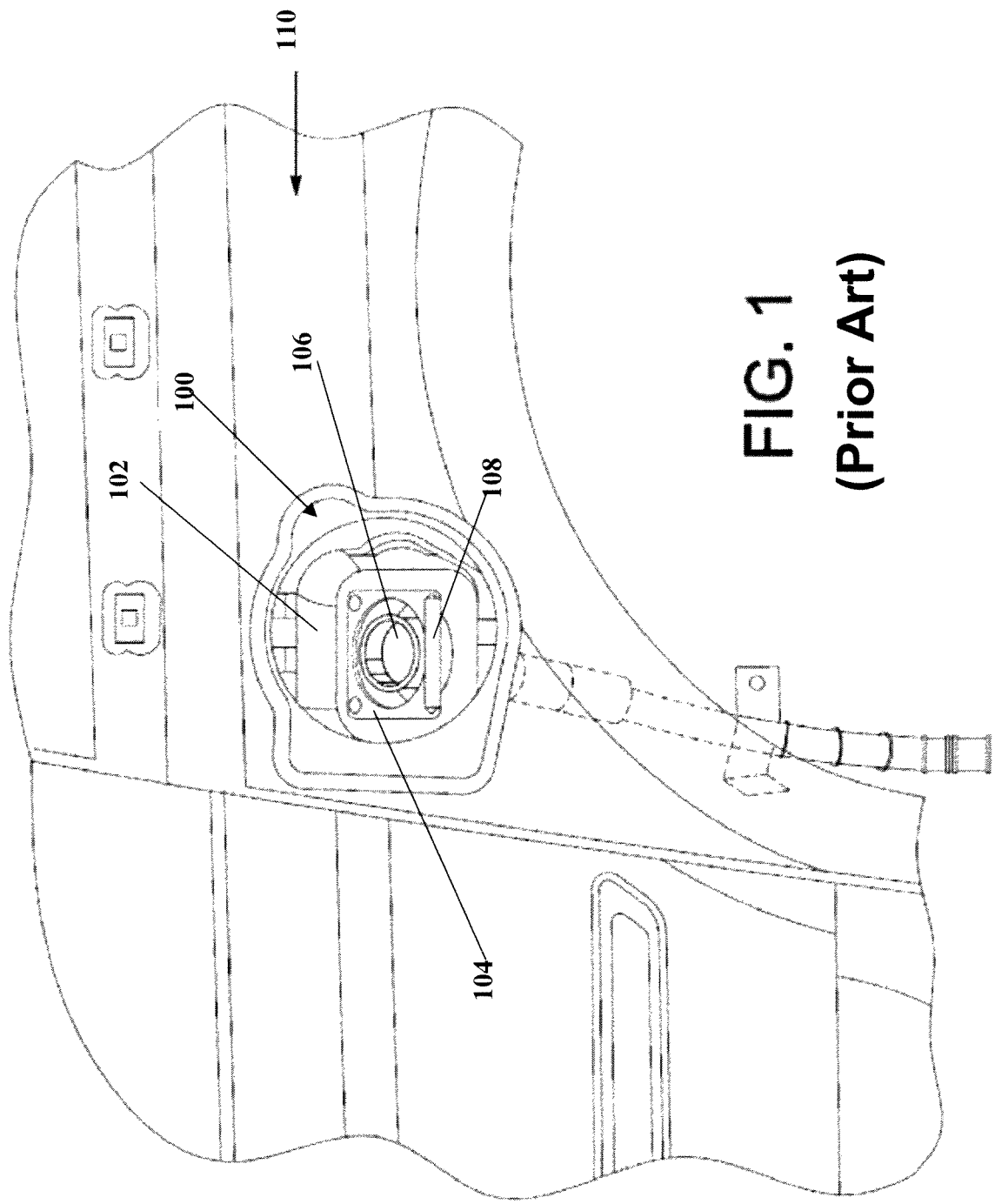
FIG. 1 is a side view of fuel filler area with a sheet metal fuel filler adapter.
Figure 2A:
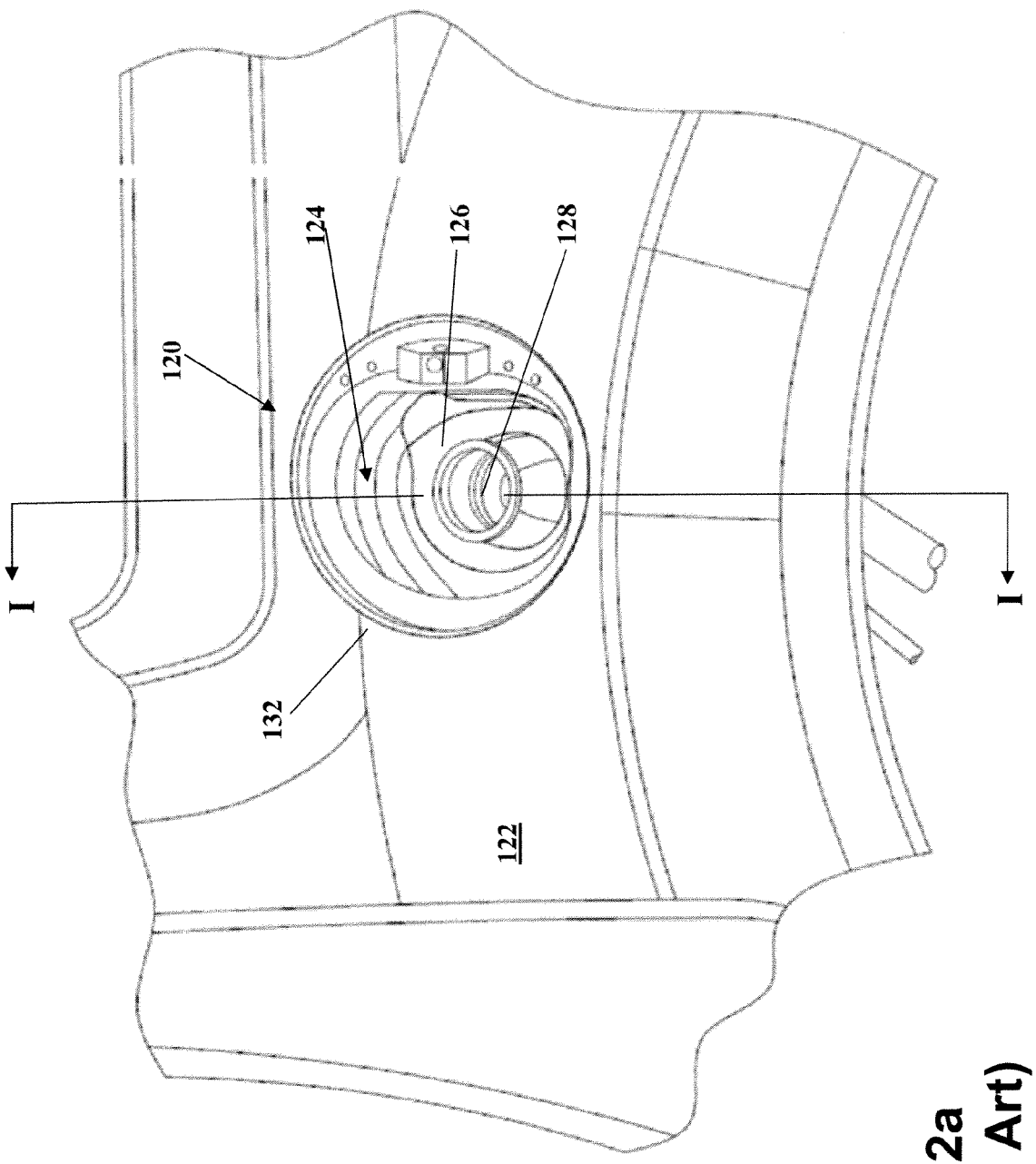
FIG. 2a is a side view of the fuel filler area with a plastic overmolded fuel filler adapter.
Figure 2B:
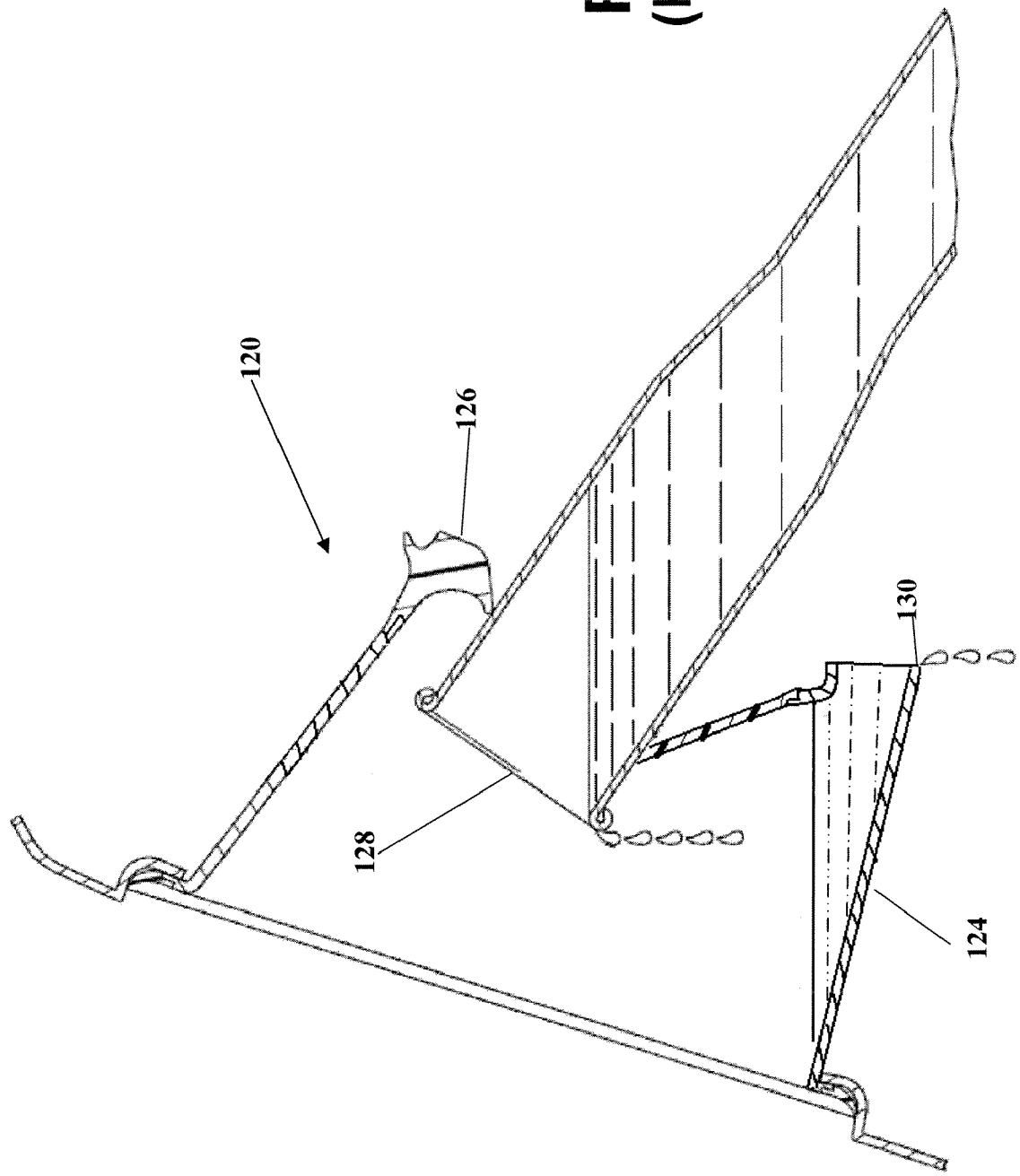
Figure 3:
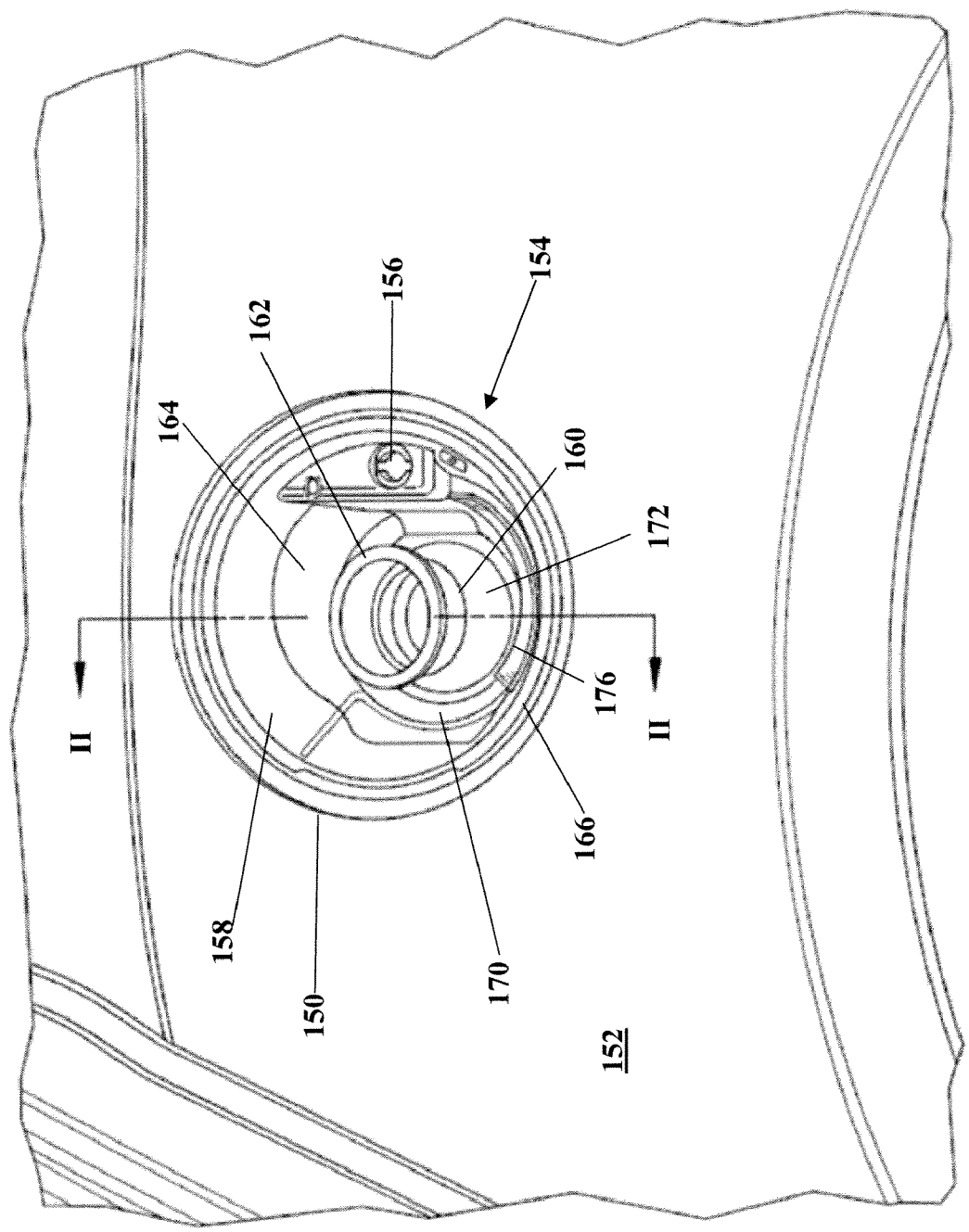
FIG. 3 is a side view of the fuel filler area with an improved fuel filler adapter according to one exemplary embodiment.
Figure 4:
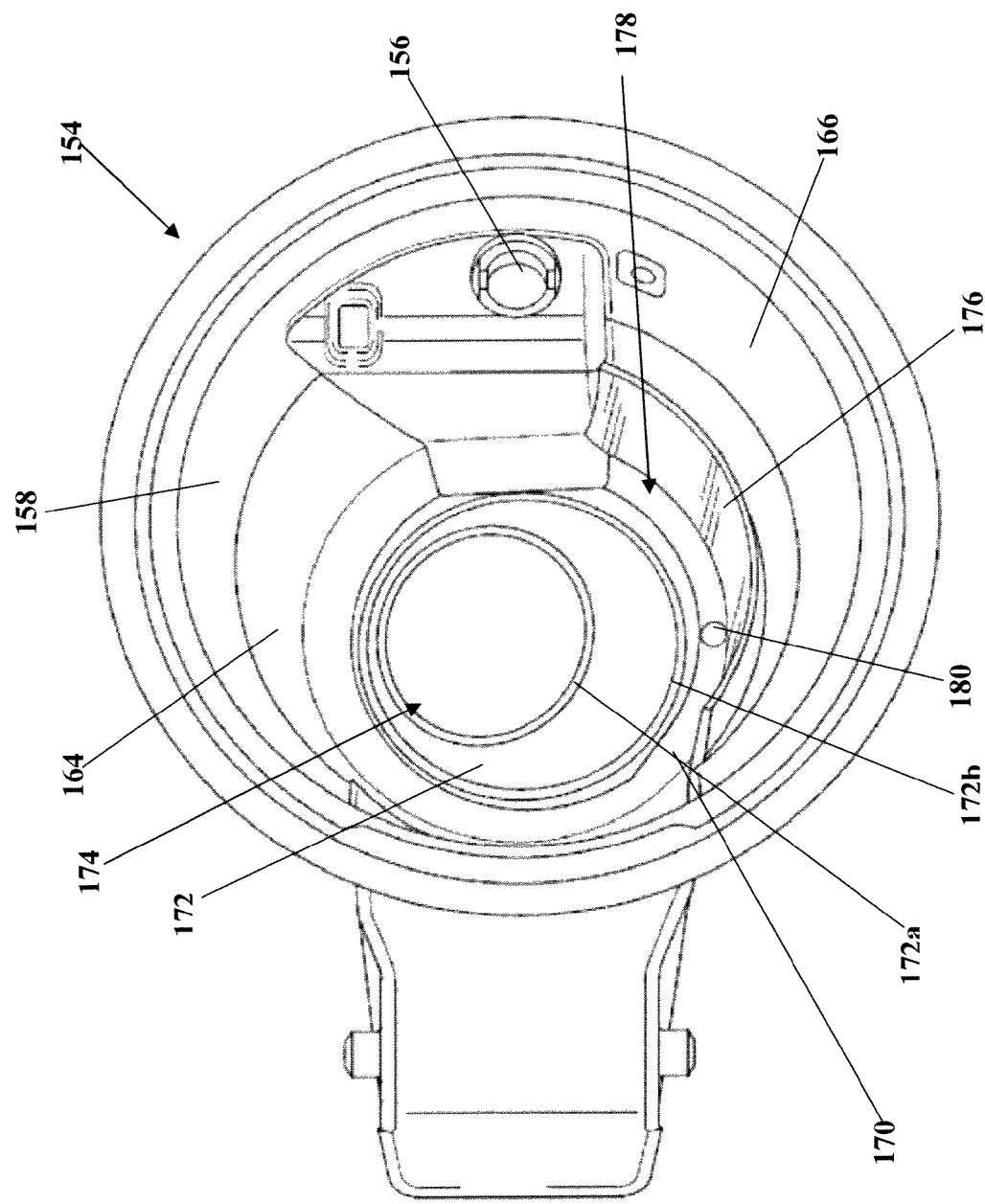
FIG. 4 is an enlarged view of the fuel filler adapter of FIG. 3 shown removed from the fuel filler area.
Figure 5:
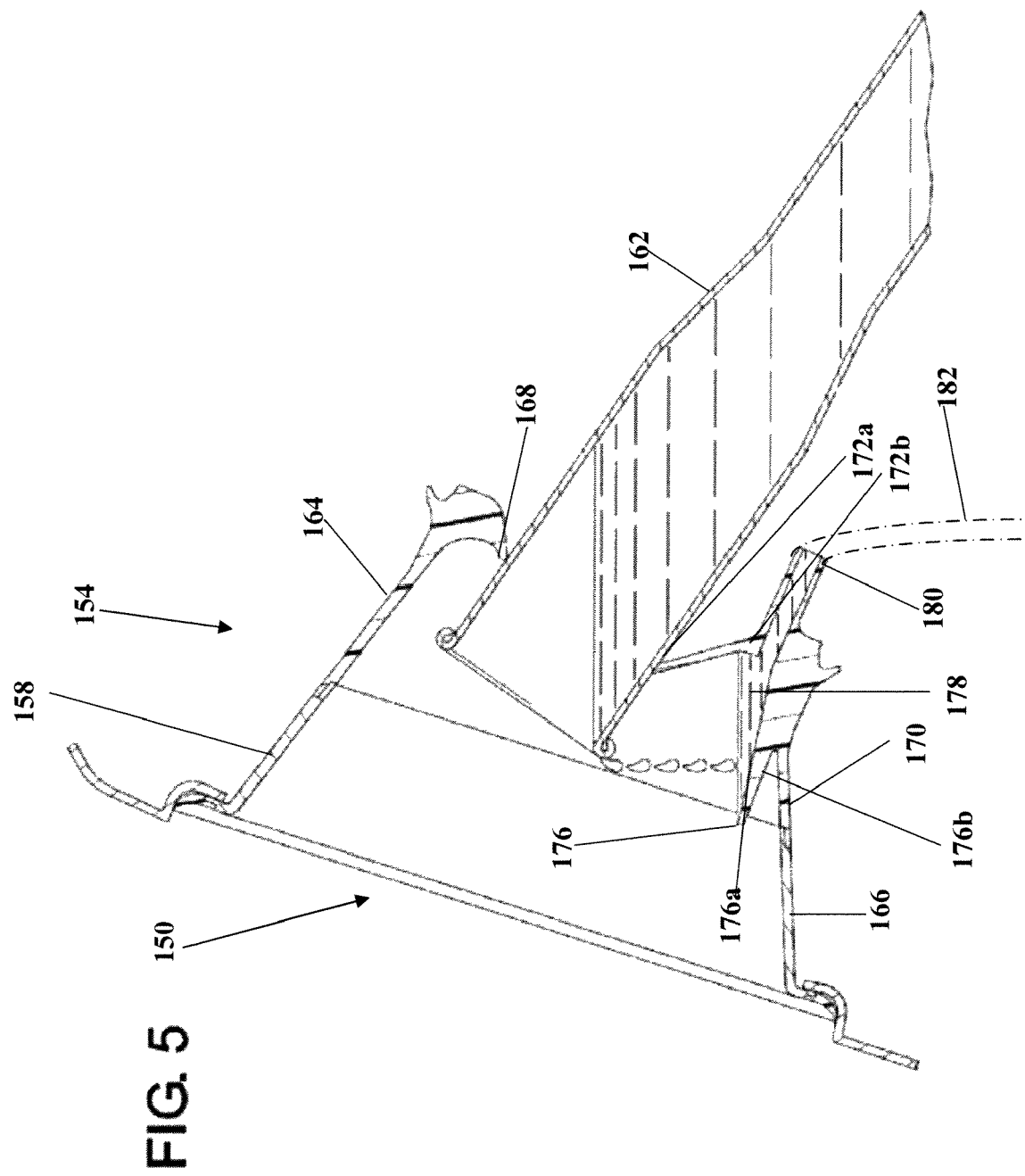
FIG. 5 is an enlarged, cross-sectional view of the fuel filler area taken along the line II-II of FIG. 3.

Referring now to the drawings, wherein the showings are only for purposes of illustrating one or more exemplary embodiments, a fuel filler assembly is described that can protect an automobile's outside painted surface from damage caused by fuel spills or overflows. As shown in FIGS. 3-5, an exemplary embodiment includes a fuel filler assembly having a rigid housing with a flexible material overmolded thereon.

Referring specifically to FIG. 3, a side view of the fuel filler area according to one exemplary embodiment is illustrated. The fuel filler area comprises a fuel filler opening 150 in the side panel 152 of a vehicle body. The fuel filler opening 150 is generally covered by a fuel filler door (not shown) to prevent dirt and other impurities from entering the fuel filler area, although this is not required. A fuel filler adapter 154 is secured in the fuel filler opening 150 by any acceptable means commonly known in the art. In one embodiment, the adapter 154 includes a fastener 156 for securing the adapter 154 to the vehicle body. The adapter 154 includes a rigid housing 158 connected to the vehicle that defines a hollow cavity with an opening 160 in which a fuel pipe 162 may be secured. A flexible overmold 164 is formed to the rigid housing 158 to form the completed adapter 154.

As best seen in FIGS. 4 and 5, the adapter 154 is preferably formed as a single-piece that is produced in a two-step process. The rigid housing 158 is molded and shaped in a first process, creating a generally hollow cavity with base portion 166 and an opening 168. Preferably, the base portion 166 is substantially parallel to the ground or has an angle sloping upward laterally into the vehicle, such as less than about 20°, for example. The rigid housing 158 is formed to complement any configuration of a fuel filler opening 150. The housing may be essentially circular, rectangular, or any other shape necessary for proper insertion into the fuel filler opening 150. Accordingly, the fuel filler door may have a corresponding shape to both the adapter 154 and the fuel filler opening 150 in order to be able to close off the opening of the fuel inlet compartment.

In a secondary process, the flexible overmold 164 is molded around the rigid housing 158 in such a way as to complete the overall shape of the adapter 154. Preferably, both the rigid housing 158 and the flexible overmold 164 are comprised of plastic and therefore are not sensitive to moisture. However, it is possible that only one piece comprises plastic, or even that neither the rigid or flexible pieces comprise a plastic material. In one embodiment, overmold 164 includes both a base wall 170 and a radial wall 172 extending outwardly from the base wall 170. The radial wall 172 has a proximal 172a and a distal 172b portion relative to the base wall 170. The distal portion 172b of the radial wall 172 defines an aperture 168. Preferably, the radial wall 172 has at least a slightly larger radius at the proximal portion 172a than at the distal portion 172b. Alternatively, the radial wall 172 may have a constant radius throughout.

When the overmold 164 is formed to rigid housing 158, the proximal portion 172a of the radial wall 172 defines an aperture 174 that aligns or is in registry with the opening of rigid housing 168. The adapter 154 according to the illustrated embodiment is configured in such a manner as to enable it to be inserted into a fuel filler opening in its entirety, with the flexible overmold 164 formed over the rigid housing 158.

A fuel pipe 162 may then extend through the rigid housing opening and engage with the distal portion 172b of radial wall 172, holding the fuel pipe 162 in place. A portion of the fuel pipe 162 extends into the fuel filler opening 150, providing a convenient means to re-fuel a vehicle. The fuel pipe 162 does not extend past the level of the side panel of a vehicle body 152 to ensure the fuel filler door can properly seal the fuel filler opening 150. A fuel pipe cap (not shown) preferably seals the end of fuel pipe 162 and may be threaded or secured to the fuel pipe 162 by other known means.

The flexible overmold 164 may further include a drainage skirt 176, partially surrounding the aperture 174. According to one embodiment, the drainage skirt 176 has a generally curved shape. The shape of the drainage skirt 176 can be consistent with the shape of the radial wall 172 of the aperture 174. As such, the skirt 176 may take on any shape to be consistent therewith. Preferably, the drainage skirt 176 extends outwardly from the base wall 170 below the radial wall 172, past the edge of the fuel pipe 162, to catch any fuel that may overflow or spill out of the fuel pipe 162. The fuel pipe 162 extends from the interior of the vehicle, through the aperture 174, and into the hollow cavity of the adapter 154. The fuel pipe 162 preferably extends far enough into the hollow cavity to give a vehicle operator access to the pipe for easy re-fueling.

While the base portion 166 can be parallel to the ground or have a slight angle upward laterally into the vehicle, e.g., about 1 to 20° relative to the ground, the drainage skirt 176 can have an angle sloped downward laterally into the vehicle, so as to create an overflow channel 178 between the radial wall 172 and the drainage skirt 176. The angle and slope of the skirt 176 can be such that spilled or overflow fuel stays contained in the overflow channel 178 and does not flow into the rest of the fuel filler area or onto the side panel of the vehicle body 152. The downward angle of the drainage skirt can be between about 25 to 60°, and more specifically between about 30 to 45° relative to the ground. As shown, it is the upper surface 176a of the drain skirt 176 (i.e. the surface that catches or contacts spilled/overflow fuel) that has the downward angle. The underside surface 176b can have any angle sufficient to provide adequate support to the drainage skirt 176. Advantageously, by this arrangement the base portion 166 of the rigid housing is free to remain substantially parallel to the ground, regardless of the skirt angle.

As described above, one benefit of this novel arrangement is that since the drainage skirt 176 is formed as part of the overmold 164, rather than the rigid housing 158 as seen in earlier fuel adapters, the angle of the drainage skirt 176 does not affect the rigid housing 158. This way the skirt can be formed at an angle without affecting the entire bottom portion, as seen in earlier fuel filler assemblies. Therefore, this embodiment of the arrangement ensures that there are no restrictions on the skirt angle and the base portion 166 can remain substantially parallel to the ground.

In one embodiment, the overmold 164 further includes a drain hole 180 for emptying the overflow channel 178. Preferably, the drain hole 180 is disposed in the lowest portion of the overflow channel 178. Therefore, any spilled fuel will readily drain through the drain hole 180. In another embodiment, the drain hole 180 is located at any point along the channel 178. The size of the drain hole 180 is not of particular concern, provided that the radius of the hole is smaller than the length of the drainage skirt 176. Drain hole 180 may connect to a drainage pipe 182 (shown schematically), for expelling the spilled fuel to the ground below the vehicle.

Alternatively, the drainage pipe 182 may connect to the vehicle fuel tank (not shown) to re-introduce the spilled fuel onto the tank, thus cutting waste, or may connect to some other portion of the vehicle.

Upon the occurrence of a particular event, including for example, an overflow of the fuel tank, backflow of fuel, drips from a fuel nozzle, etc., the drainage skirt 176 catches the spilled fuel and funnels it downwardly and inwardly toward the overflow channel 178. The angle of the drainage skirt directs the fuel into overflow channel 178. Preferably, the drain hole 180 is placed such that it is constantly being fed fuel via the overflow channel 178. As stated above, the drain tube (when employed) may be an outlet to the exterior of the vehicle for dispensing of the fuel, may be connected to the fuel tank for fuel recycling, or some other arrangement.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fuel filler adapter for a vehicle comprising:
a rigid housing adapted to connect to the vehicle and having a fuel pipe opening defined therethrough; and
a flexible plastic overmold formed to the rigid housing; said overmold including:
   a) a radial wall defining an aperture that is in registry with said fuel pipe opening;
   b) a drainage skirt at least partially encircling said aperture for catching overflow fuel; and
   c) an overflow channel disposed below said aperture, said overflow channel defined by at least one of said radial wall and said skirt.

2. A fuel filler adapter according to claim 1, wherein said aperture is configured to engage an associated fuel pipe.

3. A fuel filler adapter according to claim 1, wherein said radial wall includes a raised portion defining said aperture through which an associated fuel pipe is received.

4. A fuel filler adapter according to claim 1, wherein said adapter comprises a single piece.

5. A fuel filler adapter according to claim 1, wherein said overmold defines a drain hole for emptying said overflow channel.

6. A fuel filler adapter according to claim 5, wherein said drain hole is fluidly connected to a drain tube.

7. A fuel filler adapter according to claim 1, wherein a base portion of said housing is parallel to ground or has an angle slightly upward laterally into said vehicle.

8. A fuel filler adapter according to claim 7, wherein said skirt has an angle sloped downwardly laterally into said vehicle.

9. A fuel filler assembly for preventing overflow fuel from spilling down the outside surface of a vehicle, said assembly comprising:
a rigid housing attached to the vehicle and defining a cavity wall therein; and
an adapter overmolded onto said rigid housing, said adapter including an aperture adapted to receive an associated fuel pipe and a curved shelf disposed below said aperture and defining an overflow channel for receiving fuel spilling from the associated fuel pipe.

10. A fuel filler assembly according to claim 9, wherein said curved shelf is sloped inwardly and downwardly with respect to ground.

11. A fuel filler assembly according to claim 9, wherein said drainage shelf is sloped such that a significant amount of fuel can be captured before the rate of drainage out of the aperture catches up with the rate of fuel spillage.

12. A fuel filler assembly according to claim 9, wherein said housing includes a base and a radial wall extending out from said base, a distal portion of said wall defining said aperture.

13. A fuel filler assembly according to claim 9, wherein said radial wall adjacent said base has a radius at least slightly larger than the radius of said radial wall adjacent said distal portion.

14. A drain structure for collecting overflow fuel in a vehicle comprising:
a fuel inlet opening capable of receiving a fuel pipe therethrough; and
a unitary housing formed of a rigid material having a flexible plastic overlay molded thereto, said overlay defining an aperture, a lip partially around said aperture, and an overflow hole adapted to drain spilled fuel collected by said lip.

15. A drain structure according to claim 14, wherein said housing comprises a base and a radial wall extending outwardly from said base, a distal portion of said radial wall defining said aperture, and said lip having a width greater than a diameter of said aperture.

16. A drain structure according to claim 14, wherein said housing is oriented on the vehicle such that said aperture covers a fuel inlet opening defined in an outside surface of the vehicle.

17. A drain structure according to claim 14, wherein said lip is angled inwardly and downwardly with respect to the ground.

18. A drain structure according to claim 14, wherein said lip is sloped such that a significant amount of fuel can be captured before the rate of drainage out of said overflow hole the aperture catches up with a rate of fuel spillage.

19. A drain structure according to claim 14, wherein a base portion of said housing disposed below said lip is generally parallel to ground.

20. A drain structure according to claim 14, further including a drain tube fluidly connected to said overflow hole.

* * * * *